(12) United States Patent
He (10) Patent No.: US 7,606,194 B2
(45) Date of Patent: Oct. 20, 2009

(54) METHOD AND APPARATUS FOR REGISTERING A MOBILE NODE WITH A HOME AGENT

(75) Inventor: Wenxiao He, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 911 days.

(21) Appl. No.: 10/783,637

(22) Filed: Feb. 20, 2004

(65) Prior Publication Data

US 2005/0185612 A1    Aug. 25, 2005

(51) Int. Cl.
*H04W 4/00*    (2009.01)
(52) U.S. Cl. ............... 370/329; 370/338; 455/435.1
(58) Field of Classification Search .......... None
See application file for complete search history.

(56) References Cited

U.S. PATENT DOCUMENTS

| | | | |
|---|---|---|---|
| 2002/0080752 A1* | 6/2002 | Johansson et al. | 370/338 |
| 2002/0157024 A1* | 10/2002 | Yokote | 713/201 |
| 2003/0088765 A1* | 5/2003 | Eschbach et al. | 713/150 |
| 2004/0202183 A1* | 10/2004 | Thubert et al. | 370/395.31 |
| 2005/0113109 A1* | 5/2005 | Adrangi et al. | 455/456.1 |
| 2007/0230453 A1* | 10/2007 | Giaretta et al. | 370/389 |

* cited by examiner

*Primary Examiner*—Erika A Gary (57) ABSTRACT

Method, apparatus and software for registering a mobile node with a home agent. Registration occurs when a home agent is determined and a security tunnel having a single security association is established between the home agent and the mobile node. The mobile node is then registered with the mobile node using the security tunnel.

40 Claims, 9 Drawing Sheets

METHOD AND APPARATUS FOR REGISTERING A MOBILE NODE WITH A HOME AGENT

BACKGROUND

Mobile data connectivity using a cellular system is currently accomplished through a specialized protocol known as Mobile Internet Protocol (IP). At the time of this writing, Internet Protocol has been advanced to a sixth version and this sixth version includes a mobile extension (i.e. Mobile IPv6). As currently defined, a mobile node is always expected to be addressable using its home address. While a mobile node is in a home region (i.e. a home cell), the mobile node is addressed according to its home address, which is stored in a special link called a "home link". As such, the home link for the mobile node amounts to an internet protocol address that is valid while the mobile node is in its home cell. As a mobile node travels beyond its home cell, it invariably enters a foreign cell. While in this foreign cell, a different link, called a "care-of" link, is used to store an address which can be used to direct data to the mobile node while it is in the foreign cell. Typically, a mobile node receives a care-of address from a foreign agent; i.e. a router or other device responsible for managing addresses in a network included in the foreign cell.

Mobile communication mechanisms generally provide some means for correlating a home link with a care-of link. As specified by the Mobile Internet Protocol, this association means is known as a "binding". Accordingly, it is this binding that is used to forward data to a mobile node when it is in a foreign cell. Management of the binding of a mobile node occurs through a process wherein a mobile node communicates with a device known as a "home agent". The home agent is typically embodied as a router or other packet forwarding apparatus. The home agent receives a "binding update" message from the mobile node as the mobile node travels from one foreign cell to another. The home agent creates a binding according to the binding update message(s) it receives from the mobile node. In response, the home agent directs a "binding acknowledgment" message back to the mobile node. This indicates to the mobile node that the home agent has received a binding update message and has updated an association between the home-link and the care-of link.

In order for a mobile node to communicate with its home agent, it needs to determine the identity of the home agent. In some cases, the mobile node simply waits until it receives an advertisement message from the home agent. Alternatively, the mobile node dispatches a solicitation message. The solicitation message is eventually conveyed to the home agent. In response, the home agent will identify itself to the mobile node. Because a home agent can be attached to a dynamically reconfigurable network included in a home cell, the mobile node may optionally need to discover a network prefix for the home agent. The network prefix, or simply prefix can then be used to communicate with the home agent. Once a binding is established, additional messages are conveyed from the mobile node to the home agent in order to test the data path. This process is known as return routability signaling and is often used in optimizing the routing between a mobile node and a correspondent node. Return routability signaling typically tests the addressability of a mobile node by using both the home address and the care-of address of the mobile node. A correspondent node is another node with which the mobile node may communicate using a cellular data network.

A practical cellular data system uses this or some other similar type of binding mechanism so that a mobile node can be addressed irrespective of its actual physical location. As such, when a data packet is directed to the mobile node using the home link (i.e. the mobile node's home address), the data packet is forwarded either to the home address or to a foreign address according to any binding maintained by the home agent. When there is no binding, the data packet is addressed according to the address stored in the home-link. If there is such a binding, the data packet is re-routed according to the address stored in the care-of link. Once the path between a mobile node and its home agent is established, actual payload data can be communicated between the two.

As security concerns continue to rise, the establishment of bindings in a mobile networking environment was found to be susceptible to attack. As a result, the messaging between a mobile node and a home agent is now specified to include security features. For example, security for signals including at least one of a binding update message, a binding acknowledgement, a return routability signal, a prefix discover message and actual payload data can be provided by any suitable network security protocol. For example, Mobile Internet Protocol v6 incorporates provisions for security that rely on the Internet Protocol Security protocol, a.k.a. "IPsec".

As can be appreciated from this brief introduction to mobile network addressing, communication between a mobile node and a home agent must be provided in order to enable the binding mechanism used to correlate a home link with a care-of link. The determination of a network prefix for the home agent and messages associated with return routability signaling must also be supported by some form of data communications. According to the Mobile Internet Protocol, the messaging between a mobile node and a home agent is carried by data packets.

Data packets can be propagated by a network in two different modes; transport and tunneling. When a data packet is propagated in transport mode, it is directed using a source address and a destination address included in the data packet itself. When a data packet is carried by a "tunnel", the ordinary addressing scheme provided by the network is circumvented. For example, when a data packet is directed from a home agent to a mobile node, the data packet is encapsulated in a new data packet at the same level in the protocol. This new packet is called a tunneling packet. The destination address in the resultant data packet reflects the address stored in the care-of link. Once the data packet arrives in the foreign network, the original data packet, which still carries the home address of a mobile node as a destination address, is extracted from the tunneling packet and directed to the mobile node. When a data packet is directed from the mobile node back to the home agent, it must be encapsulated in a tunneling packet and directed in a like manner back to the home agent.

Until now, the signaling that occurred between a mobile node and a home agent was conveyed using two types of security protocols; IPsec transport and IPsec tunnel. Binding updates and acknowledgements and prefix discovery messages have traditionally been propagated using IPSec transport mode. Return routability signals and payload data have traditionally been propagated using IPSec tunnel mode. Using the IPSec protocol, each data path requires a distinct security policy database (SPD) and a corresponding security association (SA). Accordingly, four SPDs and four SAs are required to propagate the corresponding signal types, i.e. (1) Binding updates and acknowledgements; (2) prefix discovery messages; (3) return routability signals; and (4) payload data.

A security policy database includes information that describes the types of security features that should be used for each data path. This means that different security features can be applied to binding updates, prefix discovery messages and the other types of signals and data communicated between a mobile node and a home agent. Each corresponding security association is used to manage encryption features, such as the storage of keys, used by a particular security policy database.

There is a significant cost in terms of network bandwidth, processor performance and platform memory that needs to be paid for establishing an IPSec data path, either in transport mode or in tunnel mode. For example, each security association requires significant coordination between a mobile node and a home agent as encryption and decryption keys are passed back and forth. Then, the encryption keys need to be maintained (i.e. stored) in a processing platform (e.g. a mobile node or a home agent). Given that a mobile node can be a limited resource device, it is difficult to justify the added overhead associated with secure establishment of bindings and secure transmission of data.

SUMMARY

Disclosed are a method, apparatus and software for registering a mobile node with a home agent. Registration occurs when a home agent is determined and a security tunnel having a single security association is established between the home agent and the mobile node. The mobile node is then registered with the mobile node using the security tunnel.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
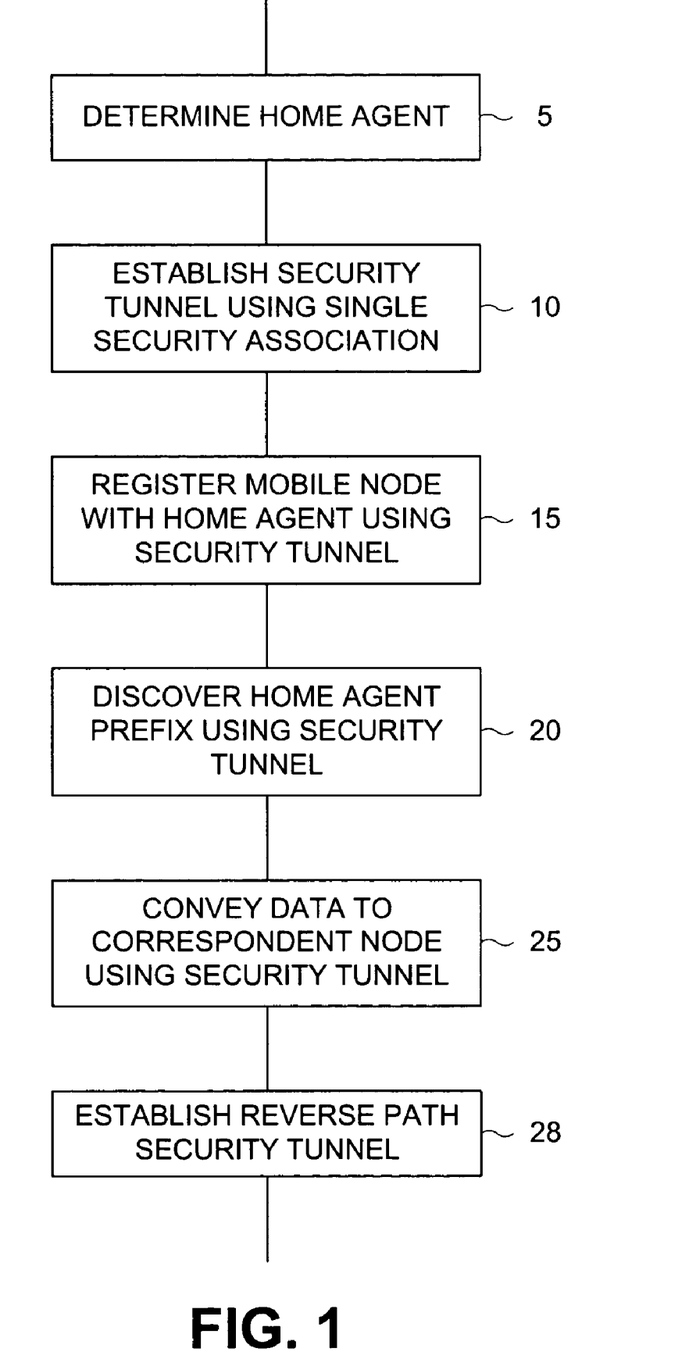
FIG. 1 is a flow diagram that illustrates one example embodiment of a method for registering a mobile node in a cellular network.

FIG. 1 is a flow diagram that illustrates one example embodiment of a method for registering a mobile node in a cellular network. According to one illustrative method, a mobile node is registered with a cellular network by determining a home agent (step 5), establishing between the mobile node and the determined home agent a security tunnel (step 10) and then registering the mobile node with the home agent using the security tunnel (step 15). According to this illustrative method, the security tunnel has associated with it a single security association which can be used by a plurality of data paths carried by the security tunnel from the mobile node to the home agent. FIG. 1 also illustrates that according to one alternative method, a reverse path security tunnel is also established (step 28). In one illustrative use case, the present method relies on a first security tunnel for conveying information from the mobile node to the home agent. According to this illustrative use case, the alternative method may be applied wherein information flowing from the home agent to the mobile node is carried by this reverse path security tunnel.

According to yet another example alternative method, registration of a mobile node further comprises discovery of an applicable prefix for the home agent (step 20). According to this example alternative method, discovery of an applicable prefix for the home agent is accomplished by using the security tunnel. Typically, discovery of an applicable prefix is accomplished by dispatching a prefix solicitation message from the mobile node to the home agent using the first security tunnel. Prefix information supplied by the home agent is directed to the mobile node using the reverse path security tunnel.

FIG. 1 also illustrates that once the mobile node is registered with the home agent, the security tunnel can be used to convey user data from the mobile node to the home agent (step 25). The reverse path security tunnel can be used to convey information from the home agent to the mobile node. According to one illustrative use case, when client data comprising a data packet is conveyed to the home agent, it is removed from the security tunnel and forwarded to a destination according to a destination address included in the data packet itself, i.e. the tunneling address is used to direct the data packet to the home agent. The destination address included in the data packet itself is used to direct the data packet to a correspondent node. According to yet another illustrative use case, when a client data packet is received from the correspondent node, it is packaged with a destination address according to a pointer stored in at least one of a home-link and a care-of link. The pointer stored in the home-link is used when the mobile node is located in a home cell. The pointer stored in the care-of link is used when the mobile mode is located in a foreign cell. Accordingly, the pointer is used by the tunneling protocol to direct a data packet to the mobile node.

Figure 2:
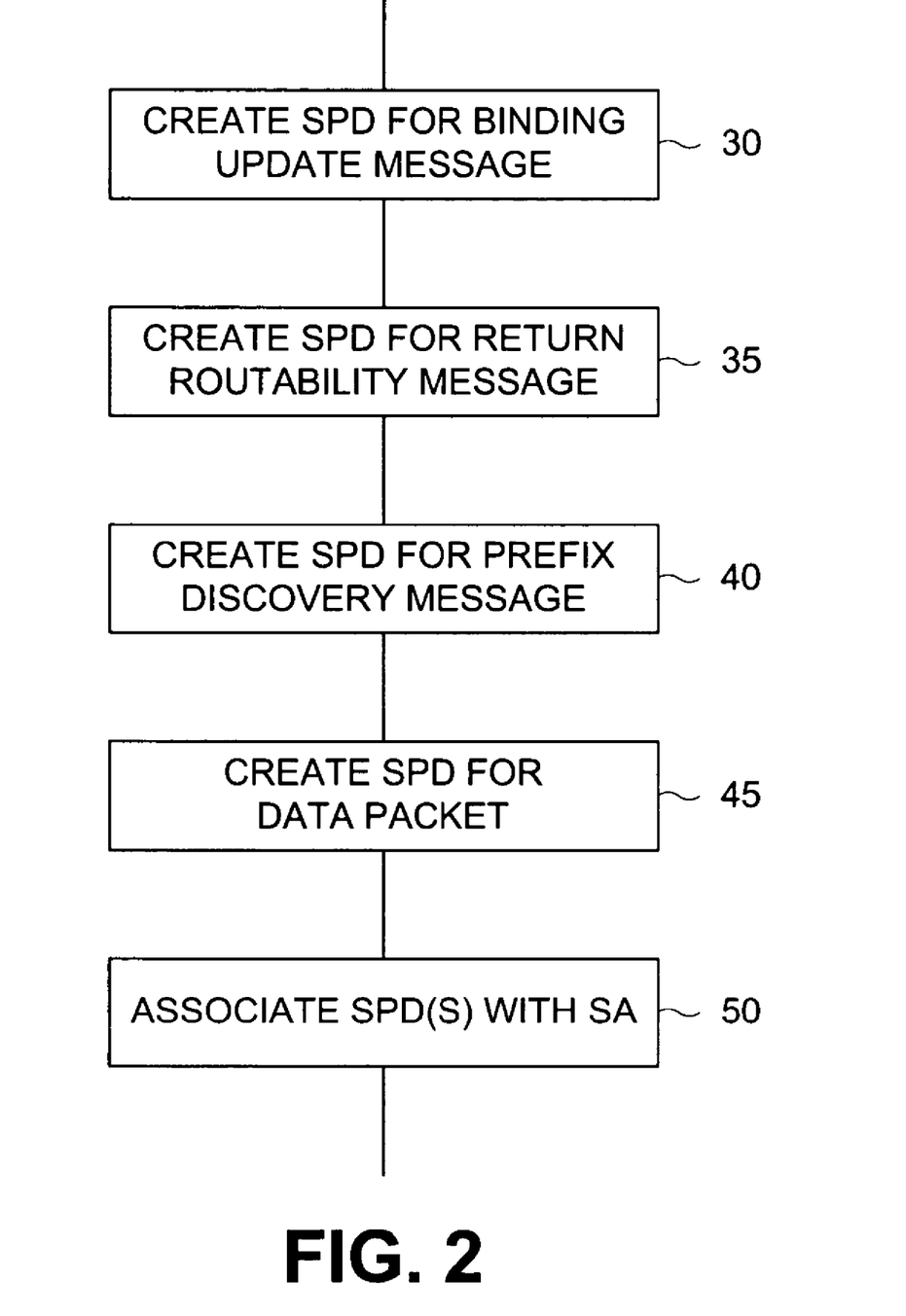
FIG. 2 is a flow diagram that depicts one example embodiment of a method for establishing a security tunnel.

FIG. 2 is a flow diagram that depicts one example embodiment of a method for establishing a security tunnel. According to this example method, a security tunnel is established by creating a security policy database (SPD) for a binding update message (step 30). In one alternative example method, a security tunnel is established by creating a security policy database for a return routability message (step 35). In yet another alternative method, a security tunnel is established by creating a security policy database for a prefix discovery message (step 40). In yet another alternative method, a security tunnel is established by creating a security policy database for a user data packet (step 45). Once a security policy database is created, it is associated with a security association (SA) (step 50).

A security policy database includes information that specifies the type of security that should be applied to a particular data path supported by a security tunnel. A security association includes encryption information, e.g. encryption keys. One feature of the present method is the use of a single security association by a plurality of data paths carried by a security tunnel. As such, two or more security policy databases are associated with a single security association according to the present method. Specific details with respect to security policy databases and security associations are well-known in the art and are defined by a specification that is promulgated within the industry, e.g. the Internet Protocol Security specification, "IPsec". It should be noted that the present method is not intended to be limited to applications where a security policy database and a security association complies with the IPsec specification. For example, the present method has defined by the appended claims may be applied in a situation where a security policy database and a security association are structured in a format that is not compliant with the IPsec specification.}

It should also be appreciated that a reverse path security tunnel, according to one alternative method, relies on a security policy database and a corresponding security association used by the first security tunnel. Accordingly, a single security association is used to support data paths from the mobile node to the home agent and is also used to support data paths from the home agent to the mobile node. In yet another alternative method, a second security association is used to support data paths carried by the reverse path security tunnel.

Figure 3:
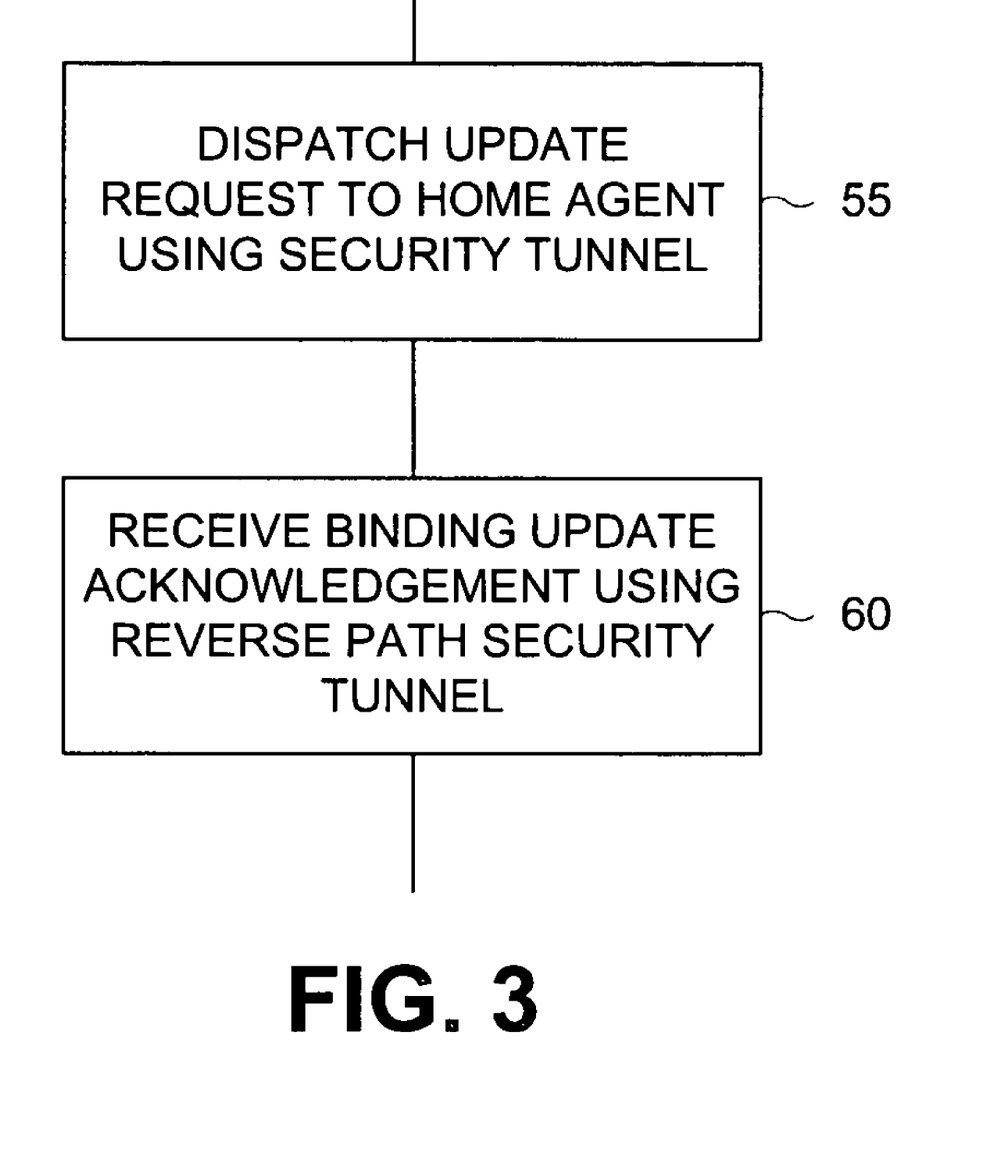
FIG. 3 is a flow diagram that depicts one example embodiment of a method for registering a mobile node with a home agent.

FIG. 3 is a flow diagram that depicts one example embodiment of a method for registering a mobile node with a home agent. According to this example method, registration of a mobile node is accomplished by dispatching a binding update request to a home agent using an established security tunnel (step 55). It should be noted that the established security tunnel is capable of supporting a plurality of data paths using a single security association. According to this example method, a binding update acknowledgment is received using a reverse path security tunnel (step 60) established according to the teachings described herein.

Figure 4:
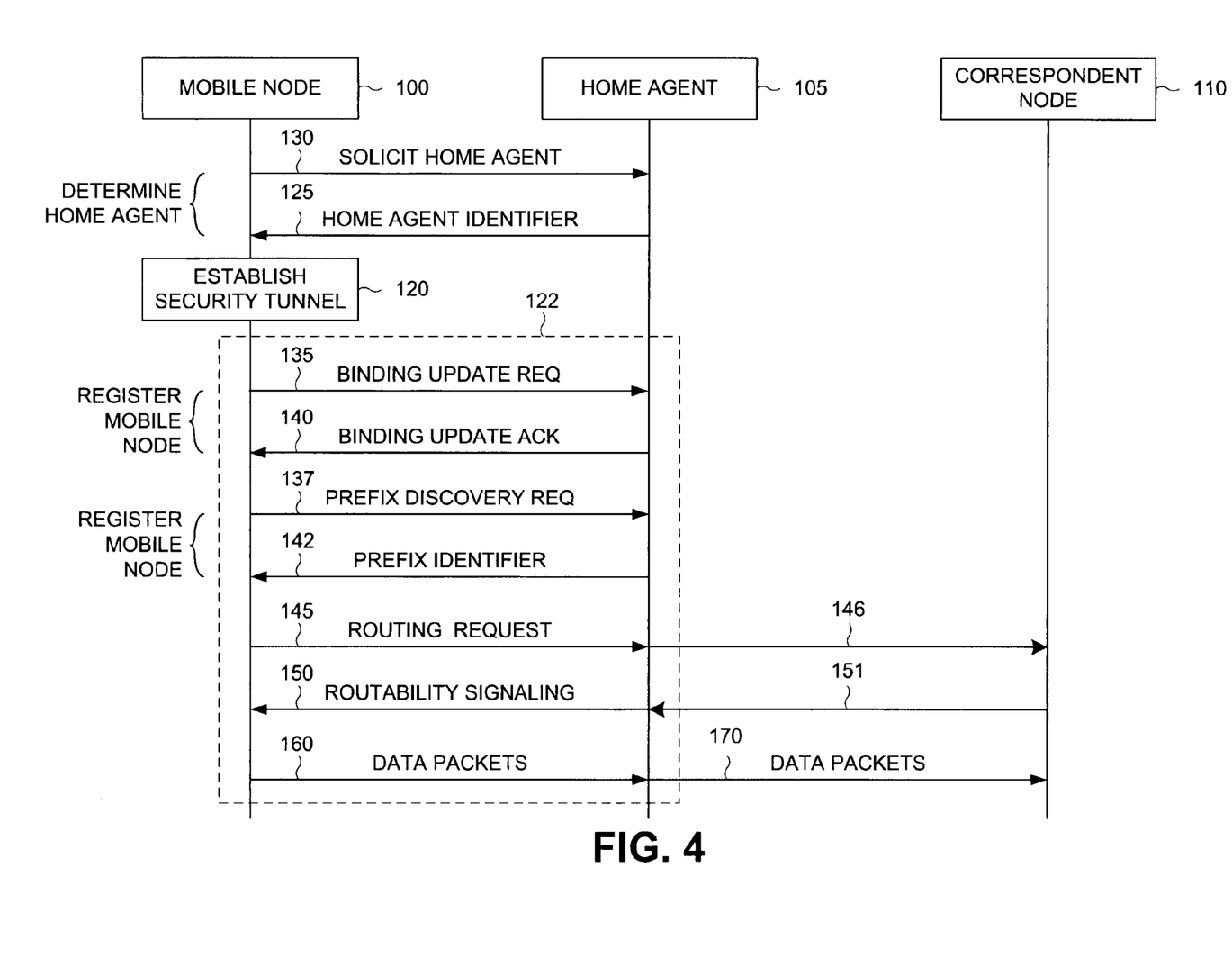
FIG. 4 is a message diagram that further depicts a process for registering a mobile node with a home agent.

FIG. 4 is a message diagram that further depicts a process for registering a mobile node with a home agent. According to one the illustrative use case, the present method is applied when a mobile node 100 needs to establish communications with a home agent to 105. In such case, the mobile node 100 must first determined the identity of the home agent 105. This can be accomplished when the mobile node 100 dispatches a solicitation message 130. The home agent 105 responds to the solicitation message 130 with a home agent identifier 125: This technique for determining a home agent is also known as dynamic home agent discovery. According to one alternative method, the mobile node 100 passively waits for a home agent identifier 125, e.g. by receiving a message known as an advertisement from the home agent 105.

Once the home agent 105 is identified, the mobile node 100 establishes a security tunnel (step 120). The resulting security tunnel 122 is capable of supporting various types of data, known as "data paths". Each data path supported by the resulting security tunnel 122 has associated therewith a security policy database. The security policy databases for two or more data paths are associated with a single security association according to the method herein described. The resulting security tunnel 122 is generally capable of supporting data paths for at least one of a binding update message, a return routability message, a prefix discovery message and a payload data packet.

The resulting security tunnel 122 is used to communicate a binding update request 135 to the home agent 105. In response, the home agent 105 conveys a binding update acknowledgment 140 to the mobile node 100 using the security tunnel 122. It should be noted that, according to one alternative use case of the present method, the binding update acknowledgment 140 is conveyed to the mobile node 100 using a reverse path security tunnel. According to one alternative use case, the present method is used to discover a prefix for the home agent 105. The present method utilizes the established security channel 122 to convey a prefix discovery request 137 to the home agent 105. The home agent responds to the prefix discovery message 137 by conveying a prefix identifier 142 to the mobile node 100 using the established security tunnel 122, or according to an alternative embodiment, by way of a reverse path security tunnel commensurate with the present method. Yet another alternative use case supports conveyance of return routability signaling using the established security tunnel 122. Accordingly, a routing request 145 is sent from the mobile node 100 to the home agent 105 using the established security tunnel 122. Once the routing request arrives at the home agent, it is extracted from the security tunnel 122 and directed 146 to a correspondent node 110. Routability signaling 155 is conveyed to back 151 to the home agent 105. The routability signaling is then directed 150 from the home agent 105 to the mobile node 100 using the established security tunnel 122 or a reverse path security tunnel.

In order to convey client data to the home agent 105, the mobile node 100 uses the established security tunnel 122 to convey a data packet 160 from the mobile node 100 to the home agent 105. In a typical application of the present method, the home agent 105 extracts the data packet from the established security tunnel 122 and directs the data packet 170 to a correspondent node 110.

Figure 5:
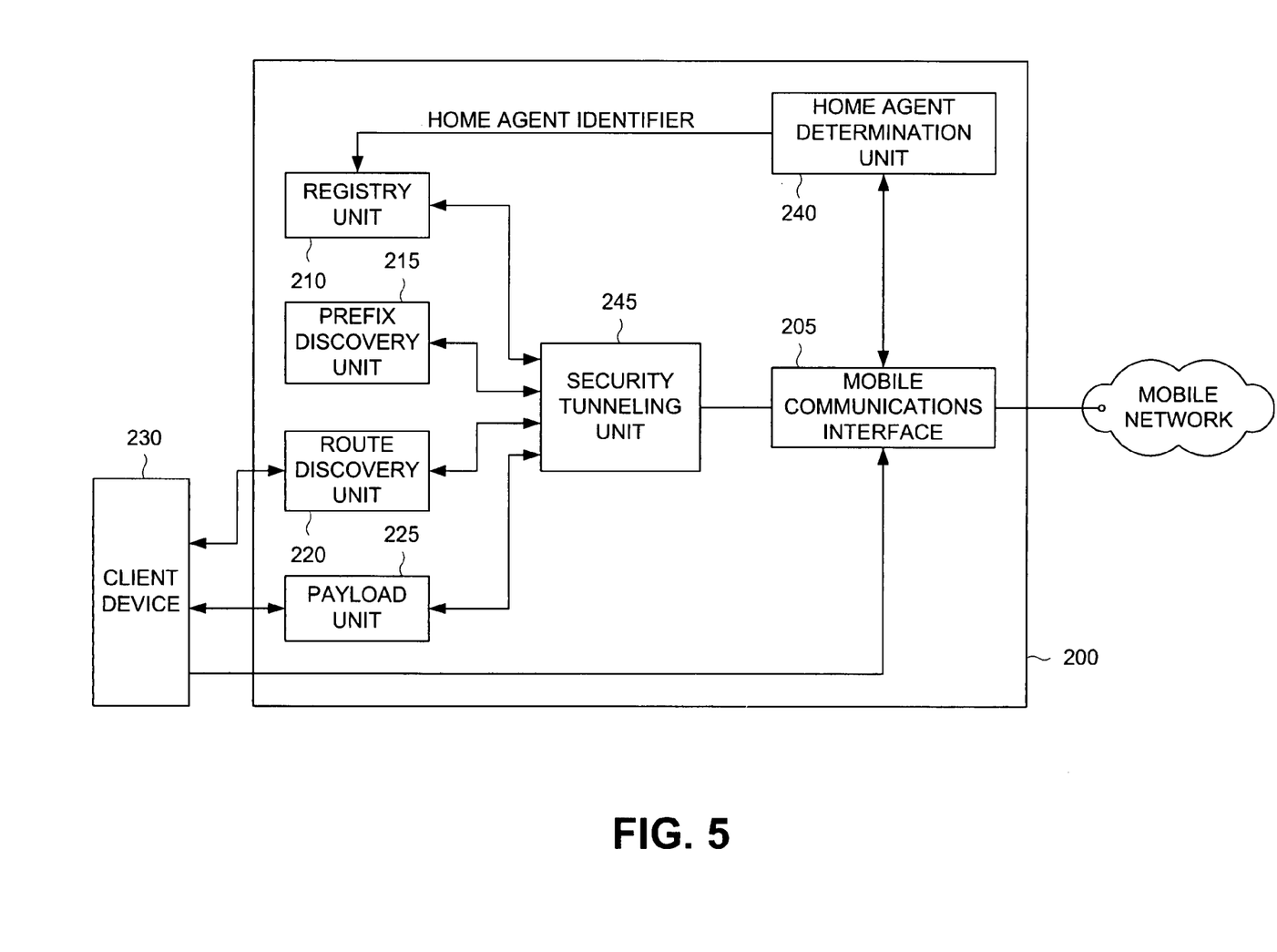
FIG. 5 is a block diagram that depicts one example embodiment of a mobile node.

FIG. 5 is a block diagram that depicts one example embodiment of a mobile node. According to this example embodiment, a mobile node 200 comprises a mobile communications interface 205, a home agent determination unit 240, a security tunneling unit 245 and a registration unit 210. The registration unit is sometimes referred to as a registry unit 210. According to this example embodiment, the mobile communications interface 205 is capable of communicating with a mobile network, e.g. a cellular data network. The home agent determination unit 240 of this example embodiment identifies a home agent. In one alternative embodiment, the home agent determination unit 240 monitors message traffic received by the mobile communications interface 205. When the home agent determination unit 240 perceives a home agent advertisement, it generates a home agent identifier according to the home agent advertisement. A home agent identifier included in the home agent advertisement is conveyed to the registration unit 210. The registration unit 210 also conveys the home agent identifier to the security tunneling unit 245. The security tunneling unit 245 is capable of establishing and maintaining a security tunnel between the mobile node and the identified home agent. According to this example embodiment, the security tunneling unit 245 uses a single security association descriptor for one or more data paths. Once the security tunneling unit 245 establishes a security tunnel to the home agent, the registration unit 210 registers the mobile node with the identified home agent using the established security tunnel.

Figure 6:
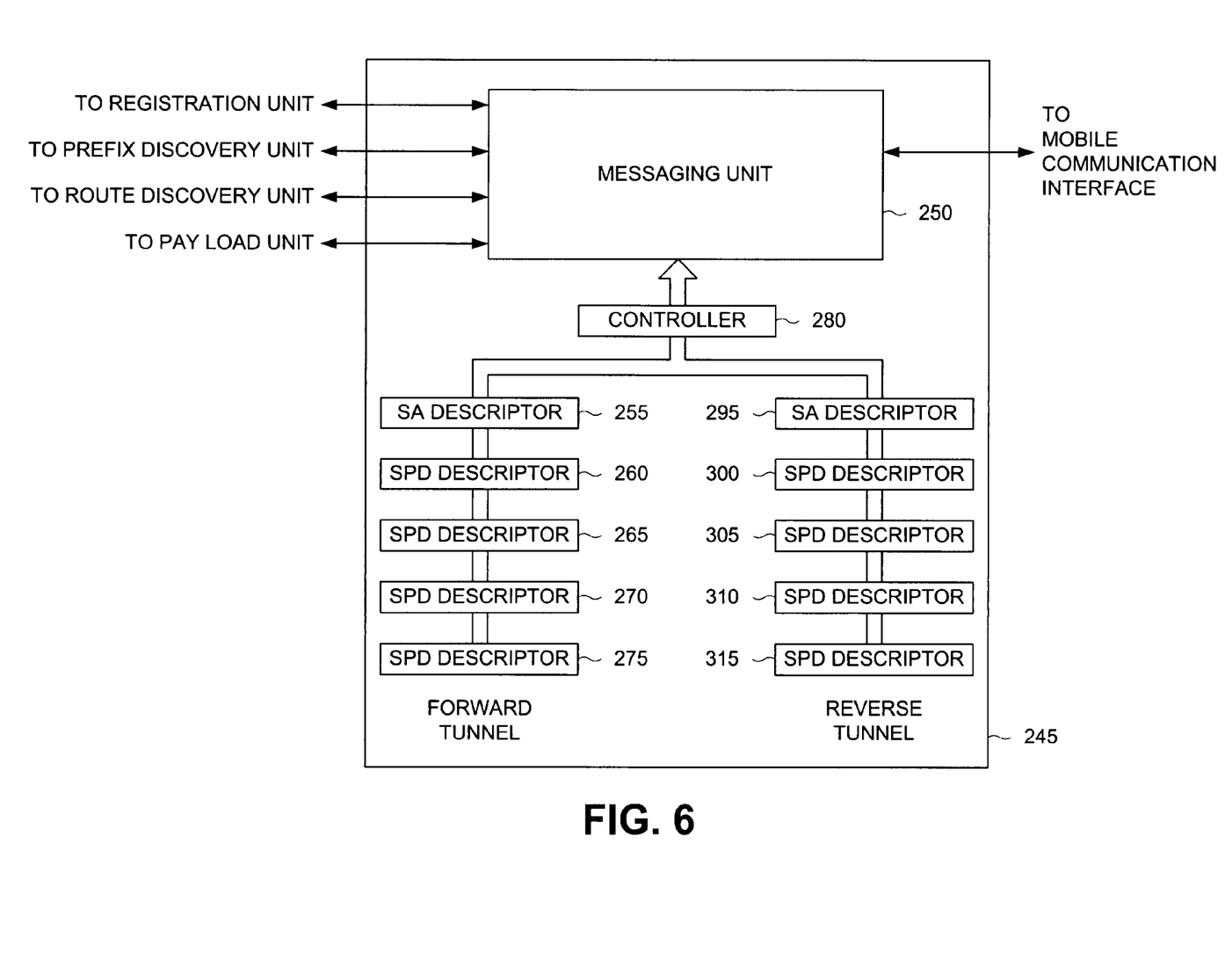
FIG. 6 is a block diagram that depicts one illustrative embodiment of a security tunneling unit.

FIG. 6 is a block diagram that depicts one illustrative embodiment of a security tunneling unit. According to this illustrative embodiment, a security tunneling unit 245 comprises a security association descriptor 255 and a security policy descriptor for at least one of a binding update message 260, a return routability message 265, a prefix discovery message 270 and a payload data packet 275. The security tunneling unit 245 further comprises a messaging unit 250 that formats a secure message according to a received message, wherein said message includes at least one of a binding update message, a return routability message, a prefix discovery message and a payload data packet. The secure message is structured as a tunneling packet using a corresponding security policy descriptor. Accordingly, a security policy descriptor is selected according to the type of message received by the messaging unit 250. The messaging unit 250 uses a single security association descriptor 255 to secure the message.

The message is conveyed to the mobile communications interface as a tunneling packet and forwarded to the mobile network.

According to one alternative embodiment, the security tunneling unit 245 further comprises an additional security association descriptor 295 and additional security policy descriptors (300, 305, 310, and 315) for use in supporting a reverse path security tunnel. According to this alternative embodiment, the messaging unit 250 relies on security policy information stored in the additional security policy descriptors for at least one of a binding update acknowledgment message, a return routability reply message, a prefix discovery advertisement message and a return payload data packet. The messaging unit 250 recovers at least one of a binding update acknowledgment message, a return routability reply message, a prefix discovery advertisement message and a return payload data packet from a tunneling packet received from the mobile communications interface using a corresponding security policy. The messaging unit 250 uses a single security association stored in the second security association descriptor 295 used to support the reverse security tunnel.

FIG. 5 further illustrates that, according to one alternative embodiment, a mobile node 200 further comprises a prefix discovery unit 215. According to this alternative embodiment, the prefix discovery unit 215 conveys a prefix discovery message to the security tunneling unit 245. The security tunneling unit 245 selects a corresponding security policy and uses a single security association in order to propagate the prefix discovery message to a home agent using a security tunnel established thereto through a mobile network. The security tunneling unit 245 communicates with the mobile network by means of the mobile communications interface 205.

According to yet another alternative embodiment, a mobile node 200 further comprises a route discovery unit 220. The route discovery unit 220 dispatches a return routability message to the security tunneling unit 245. The security tunneling unit 245 selects a corresponding security policy and uses a single security association in order to propagate the return routability message to a home agent using a security tunnel established thereto through a mobile network. The security tunneling unit 245 communicates with the mobile network by means of the mobile communications interface 205.

In yet another illustrative embodiment, a mobile node 200 further comprises a payload unit 225. The payload unit 225 receives a data packet from a client device 230. According to one alternative embodiment, the client device 230 is included in the mobile node 200. The data packet is forwarded to the security tunneling unit 245. The security tunneling unit 245 propagates the data packet to a home agent using a corresponding security policy and the single security association associated with a security tunnel established between the mobile node 200 and the home agent.

Figure 7:
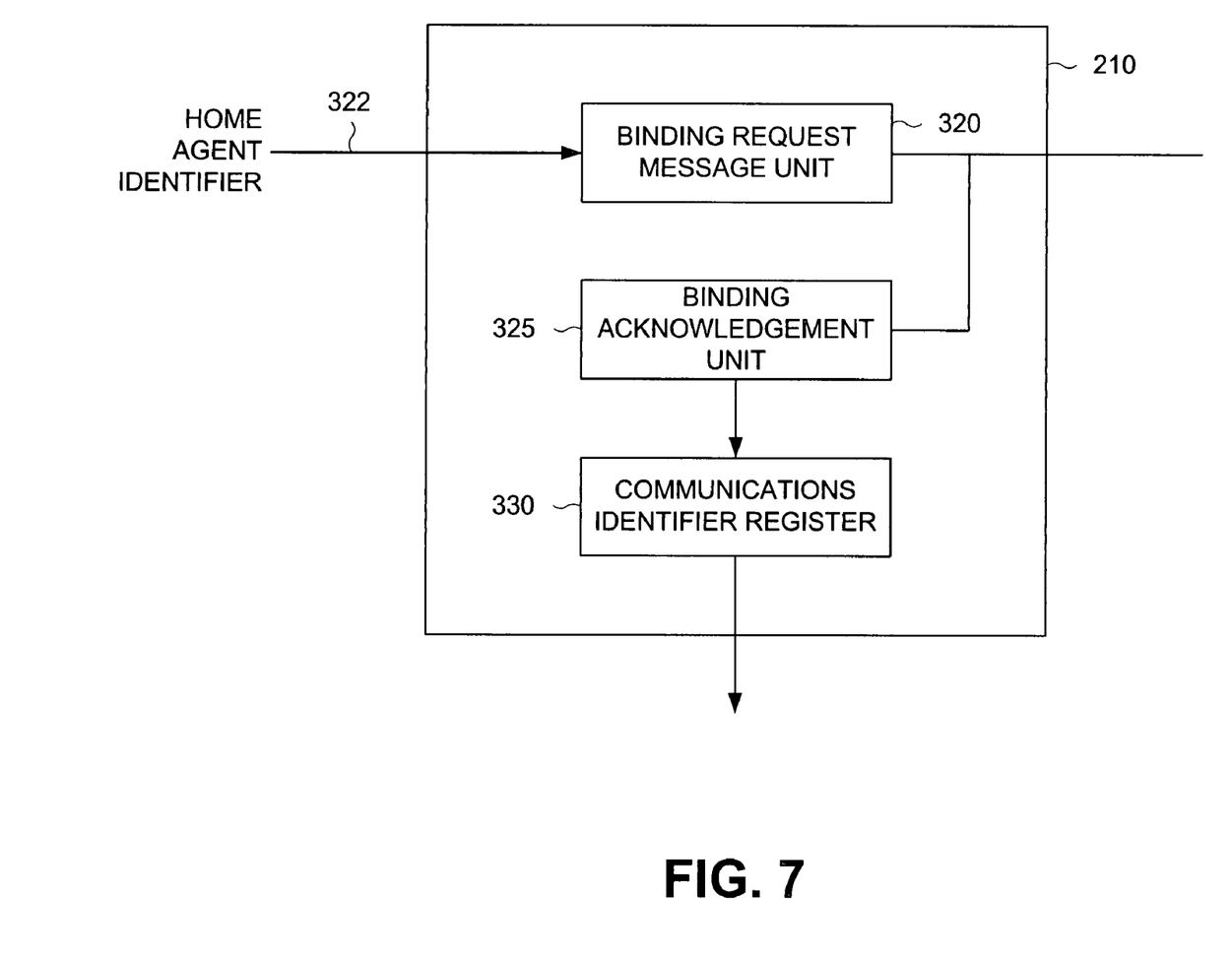
FIG. 7 is a block diagram of one example embodiment of a registration unit.

FIG. 7 is a block diagram of one example embodiment of a registration unit. According to this example embodiment, a registration unit 210 comprises a binding request message unit 320 and a binding acknowledgment unit 325. According to this example embodiment, the binding request message unit 320 receives a home agent identifier 322. The home agent identifier 322, according to one alternative embodiment, is received from a home agent determination unit 240 included in a mobile node 200. The binding request message unit 320 creates a binding request message and addresses it to a home agent according to the home agent identifier 322 received from a home agent determination unit 240. The binding request message is then directed to a security tunneling unit 245 included in one example embodiment of the mobile node 200. The security tunneling unit 245 directs the binding request message to a home agent using a security tunnel established using a single security association descriptor and two or more security policy descriptors included in the security tunneling unit 245. It should be noted that the security tunnel established by the security tunneling unit 245, according to one alternative embodiment, conforms to Internet protocol security specifications (i.e. IPsec) as heretofore described. It should also be noted that the scope of the claims appended hereto is not intended to be limited by any example embodiment herein described.

According to yet another alternative embodiment, a reverse path security tunnel established by the security tunneling unit 245 is used to receive a binding acknowledgment message from a home agent. The binding acknowledgment message is then directed to the binding acknowledgment unit 325 included in the registration unit 210. The binding acknowledgment unit 325 extracts a communication identifier from the binding message and stores this in a communications identifier register 330 also included in one alternative embodiment of a registration unit 210. The communications identifier register 330 provides the communications identifier stored therein to other devices included in a mobile node 200, e.g. a prefix discovery unit 215, a route discovery unit 220 and a payload unit 225. These other devices use the communications identifier to specify a home agent and, according to one alternative embodiment, a security tunnel to the home agent established by the security tunneling unit 245.

Figure 8:
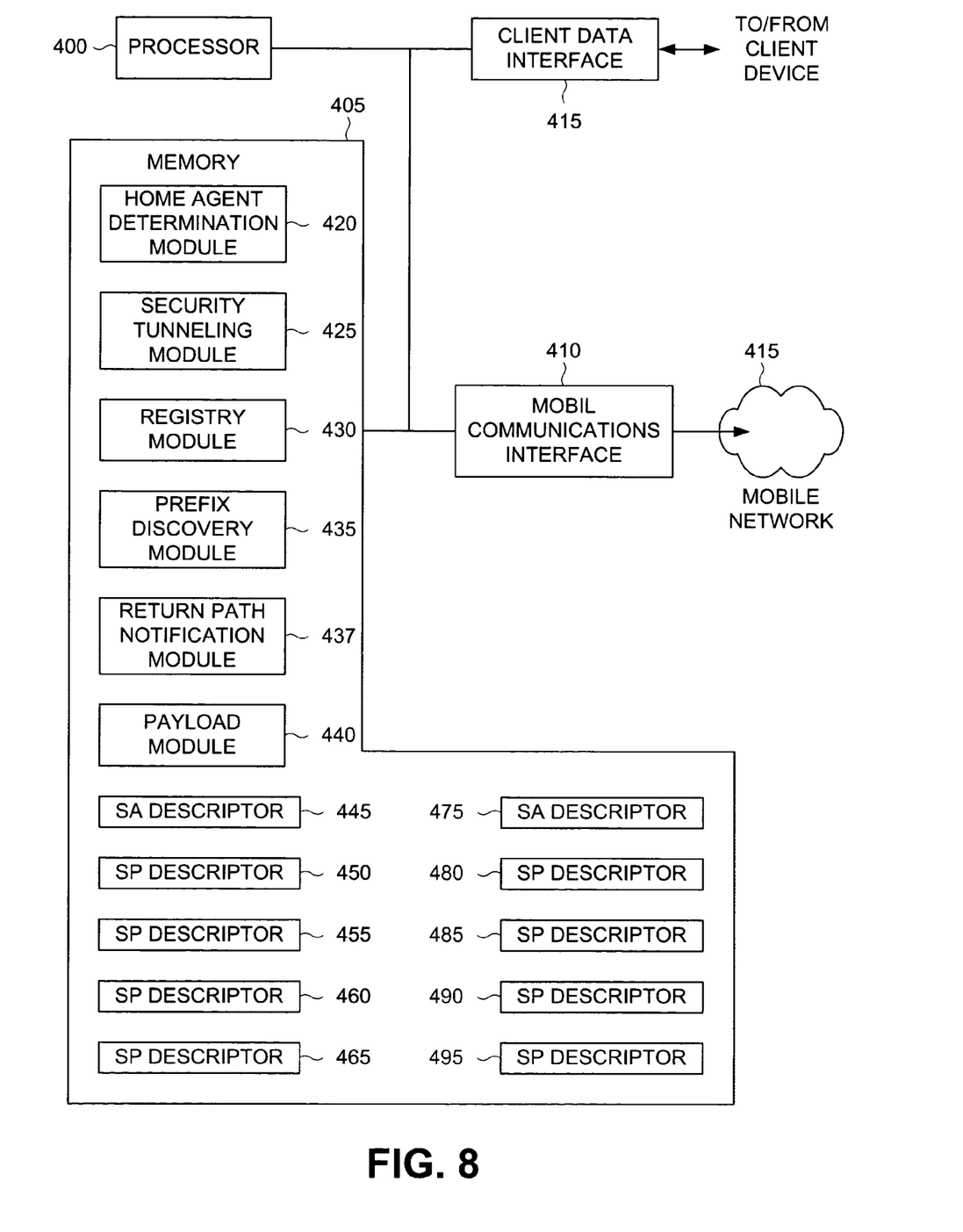
FIG. 8 is a block diagram of one alternative embodiment of a mobile node.

FIG. 8 is a block diagram of one alternative embodiment of a mobile node. According to this alternative embodiment, a mobile node comprises one or more processors 400, a memory 405 and a mobile communications interface 410. The mobile communications interface 410 is used to communicate with a mobile network 415. According to one example alternative embodiment, the mobile node further comprises a client data interface 415. According to this example alternative embodiment, the client data interface 415 can be used to communicate a data packet to and receive a data packet from a client device. According to one example embodiment, a mobile node further comprises one or more functional modules included in the memory 405. Functional modules as described herein are referred to by a functional name. A functional module comprises an instruction sequence that is executed by one or more processors 400. As the processor 400 executes a particular instruction sequence, it performs certain functions commensurate with the teachings of the present method. The reader is advised that the term "minimally causes the processor" and variants thereof is intended to serve as an open-ended enumeration of functions performed by the processor as it executes a particular functional process (i.e. instruction sequence). As such, an embodiment where a particular functional process causes the processor to perform functions in addition to those defined in the appended claims is to be included in the scope of the claims appended hereto.

The functional processes (and their corresponding instruction sequences) described herein enable registration of a mobile node with a home agent according to the teachings of the present method. According to one embodiment, these functional processes are imparted onto computer readable medium. Examples of such media include, but are not limited to, random access memory, read-only memory (ROM), Compact Disk ROM (CD ROM), Digital Versatile Disk (DVD), floppy disk, and magnetic tape. This computer readable medium, which alone or in combination can constitute a stand-alone product, can be used to convert a general-purpose computing platform or a mobile communications device (e.g. a cellular telephone) into a device capable of registering a mobile node with a home agent according to the techniques and teachings presented herein. Accordingly, the claims appended hereto are to include such computer readable medium imparted with such instruction sequences that enable execution of the present method and all of the teachings afore described.

According to one embodiment, a mobile node comprises a home agent determination module 420, a security tunneling module 425 and a registry module 430. According to one alternative embodiment, a mobile node further comprises a discovery prefix module 435. In yet another alternative embodiment, a mobile node further comprises a return path notification module 437. In yet another illustrative embodiment, a mobile node further comprises a payload module 440. The memory 405 is also used to store a security association descriptor 445 and two or more security policy descriptors. These are used by the security tunneling module 425 to govern a security tunnel established between a mobile node and a home agent. A first security policy descriptor 450 may be used to store a security policy for a first data path (e.g. for a binding update message). A second security policy descriptor 455 may be used to store a security policy for a second data path (e.g. for a return routability message). A third security policy descriptor 460 may be used to store a security policy for a third data path (e.g. for a prefix discovery message). A fourth security policy descriptor 465 may be used to store a security policy for a fourth data path (e.g. for a payload data packet). According to yet another alternative embodiment, the security tunneling module 425 uses a second security association 475 and two or more security policy descriptors to govern a security tunnel established between the home agent and the mobile node (i.e. a reverse path tunnel). According to this alternative embodiment, a fifth security policy descriptor 480 is used to support a data path from the home agent to the mobile node that is used to carry a binding acknowledgment message. A sixth security policy descriptor 485 is used to support a data path from the home agent to the mobile node that is used to carry a return routability signal. A seventh security policy descriptor 490 is used to support a data path from the home agent to the mobile node that is used to carry a prefix identifier. An eighth security policy descriptor 495 is used to support a data path from the home agent to mobile node that is used to carry a payload data packet.

Figure 9:
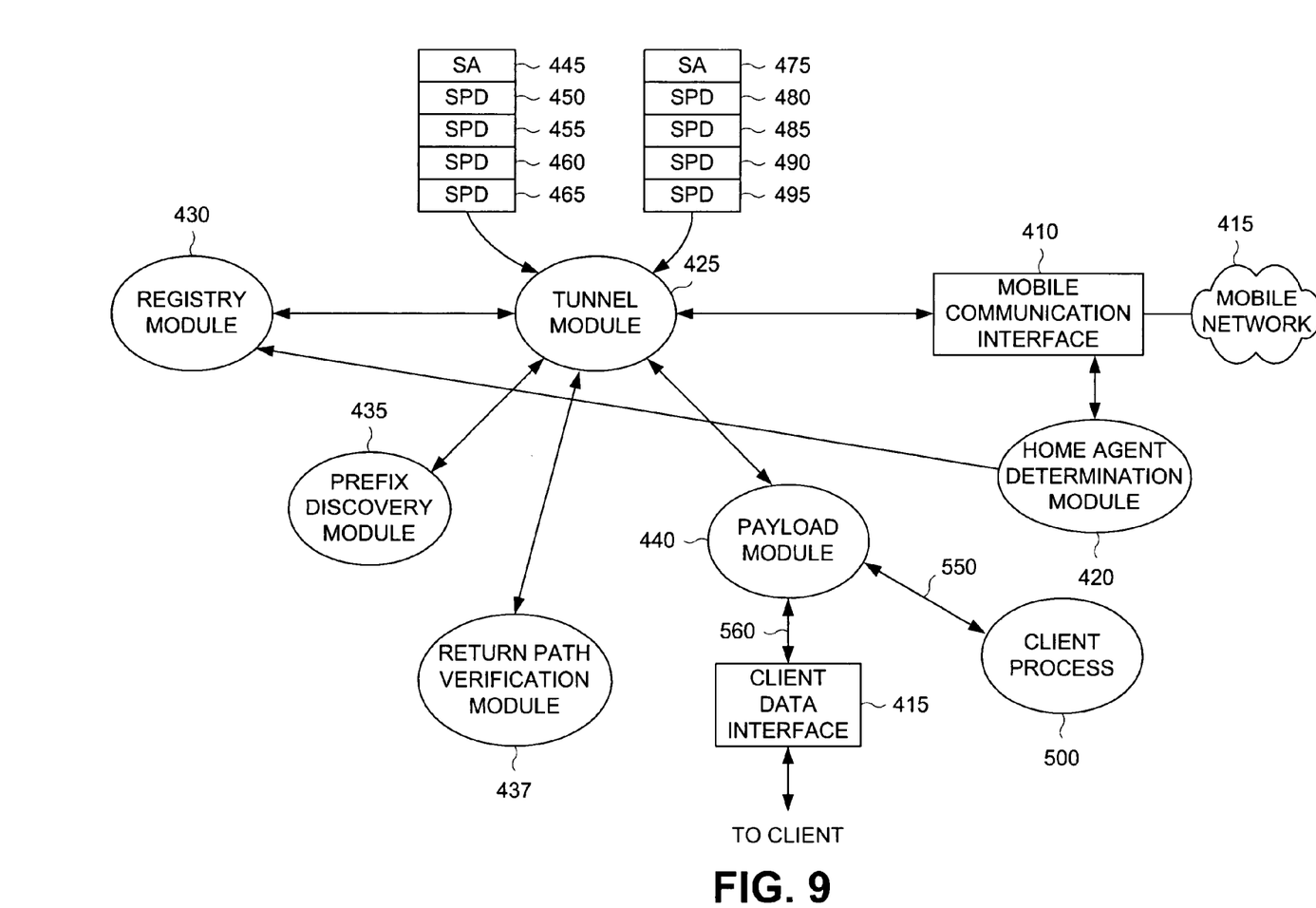
FIG. 9 is a data flow diagram that depicts the operation of one example embodiment of a mobile node.

FIG. 9 is a data flow diagram that depicts the operation of one example embodiment of a mobile node. According to this example embodiment, the home agent determination module 420, when executed by the processor 400, minimally causes the processor 400 to identify a home agent for a mobile node. According to one alternative embodiment, the home agent determination module 420 minimally causes the processor 400 to receive a home agent advertisement message from a mobile communications network 415 through the mobile communications interface 410. According to one alternative embodiment, the home agent determination module 420 minimally causes the processor 400 to dispatch a home agent solicitation message to the mobile communications network 415 using the mobile communications interface 410. In response, an available home agent conveys a home agent advertisement message to the mobile communications network 415 from whence it may be received by the processor 400 as it executes the home agent determination module 420.

Once a home agent is identified, the processor 400 executes the security tunneling module 425. The security tunneling module 425, when executed by the processor 400, minimally causes the processor 400 to establish a security tunnel from the mobile node to the identified home agent by using a single security association descriptor (e.g. a first security association 445) to support a plurality of data paths from the mobile node to the home agent. The processor 400 executes the registry module 430 once a security tunnel to the identified home agent is established. When executed by the processor 400, the registry module 430 minimally causes the processor 400 to register the mobile node with the identified home agent. According to one alternative embodiment, the registry module 430 minimally causes the processor 400 to register the mobile node with the identified home agent by minimally causing the processor 400 to dispatch a binding update request message to the identified home agent using the security tunnel established by the processor 400 as it executes the security tunneling module 425. It should be noted that the processor 400 establishes a security tunnel through a mobile communications interface 410 which enables the processor 400 to communicate with a mobile communications network 415. The security tunneling module 425 minimally causes the processor 400 to use a first security policy descriptor 450 and the first security association 445 to govern the security associated with a data path used to convey the binding update request message to the home agent.

According to yet another alternative embodiment, the security tunneling module 425, when executed by the processor 400, minimally causes the processor 400 to use the first security association 445 in conjunction with a second security policy descriptor 455 to govern the security associated with a data path from the mobile node to the identified home agent that is used to carry a return routability message. In yet another alternative embodiment, the security tunneling module 425, when executed by the processor 400, minimally causes the processor 400 to use the first security association 445 in conjunction with a third security policy descriptor 460 to govern the security associated with a data path from the mobile node to the identified home agent that is used to carry a prefix discovery message. Yet another alternative embodiment of the tunneling module 425 minimally causes the processor 400 to use the first security association 445 in conjunction with a fourth security policy descriptor 465 to govern the security associated with a data path from the mobile node to the identified home agent that is used carry a payload data packet.

According to one alternative embodiment, the security tunneling module 425 further minimally causes the processor 400 to establish a reverse path security tunnel that is capable of carrying a plurality of data paths using a single security association. According to this alternative embodiment, the security tunneling module 425 uses a second security association 475 in conjunction with two or more security policy descriptors to govern the security associated with a data path from the identified home agent to the mobile node. For example, one alternative embodiment of the security tunneling module 425 minimally causes the processor 400 to use the second security association 475 with a fifth security policy descriptor 480 to govern the security associated with a data path from the identified home agent to the mobile node that is used carry a binding acknowledgment message. In yet another alternative embodiment, the security tunneling module 425, when executed by the processor 400, minimally causes the processor 400 to use the second security associated 475 in conjunction with a sixth security policy descriptor 485 to govern the security associated with a data path from the identified home agent to the mobile node that is used to carry a return routability message. According to yet another alternative embodiment of the tunneling module 425, the processor 400 is minimally caused to use a seventh security policy descriptor 490 in conjunction with the second security association 475 to govern the security associated with a data path from the identified home agent to the mobile node that is used carry a prefix identification message. In yet another alternative embodiment, the tunneling module 425, when executed by the processor 400, minimally causes the processor 400 to use an eighth security policy descriptor 495 in conjunction with the second security association 475 to govern the security associated with a data path used to carry a payload data packet from the identified home agent to the mobile node.

FIG. 9 also illustrates that according to one alternative embodiment, the processor 400 further executes the prefix discovery module 435. According to this alternative embodiment, the prefix discovery module 435, when executed by the processor 400, further minimally causes the processor 400 to discover a prefix for an identified home agent using a security tunnel established by the processor 400 when it executes the security tunneling module 425. Generally, the prefix discovery module 435 minimally causes the processor 400 to dispatch the prefix discovery message to identified home agent using said established security tunnel. Using a reverse security tunnel, the processor 400 receives a prefix message 455 from the identified home agent as it continues to execute the prefix discovery module 435.

FIG. 9 further illustrates that according to yet another alternative embodiment, the processor 400 further executes the payload module 440. When executed by the processor 400, the payload module 440 further minimally causes the processor to direct a payload data packet to the identified home agent using a security tunnel established by the processor 400 when it executes the security tunneling module 425. According to yet another alternative embodiment, the payload module 440, when executed by the processor 400, minimally causes the processor 400 to interact 560 with the client data interface 415. The client data interface 415 is capable of receiving data from or directing data to a client device. According to yet another alternative embodiment, the payload module 440, when executed by the processor 400, minimally causes the processor 400 to interact 550 with a client process 500. Accordingly, the payload module 440 causes the processor 400 to direct data to or receive data from said client process 500.

According to yet another alternative embodiment, the processor 400 further executes a return path verification module 437. When executed by the processor 400, the return path verification module 437 further minimally causes the processor 400 to direct a return routability message to an identified home agent using the security tunnel established by the processor 400 as it executes the security tunneling module 425.

While this method and apparatus have been described in terms of several alternative methods and exemplary embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for registering a mobile node with a home agent comprising:
   determining a home agent;
   establishing between the mobile node and the determined home agent a security tunnel having associated with said tunnel a single security association; and
   registering the mobile node with the home agent using the security tunnel.

2. The method of claim 1 wherein establishing a security tunnel comprises:
   creating a security policy database for at least one of a binding update message, a return routability message, prefix discovery message and payload data packet; and
   associating two or more security policy databases with a security tunnel using a single security association.

3. The method of claim 1 wherein registering the mobile node with the home agent comprises:
   dispatching a binding update request to the home agent using the security tunnel; and
   receiving a binding update acknowledgement by way of a reverse path security tunnel.

4. The method of claim 1 further comprising discovering an applicable prefix for the home agent using the security tunnel.

5. The method of claim 1 further comprising conveying data to a correspondent node using the security tunnel.

6. The method of claim 1 further comprising communicating a return routability signal to the home agent using the security tunnel.

7. The method of claim 1 further comprising establishing a reverse path security tunnel having associated with said tunnel a single security association.

8. The method of claim 7 wherein establishing a reverse path security tunnel comprises creating a security policy database for at least one of a binding update message, a return routability message, prefix discovery message and payload data packet;
   and associating one or more security policy databases with a security tunnel using a single security association.

9. A mobile node comprising:
   mobile communication interface capable of communicating with a mobile network;
   home agent determination unit capable of identifying a home agent; security tunneling unit capable of establishing and maintaining a security tunnel between the mobile node and an identified home agent, wherein an established security tunnel uses a single security association descriptor for one or more data paths; and
   registration unit capable of registering the mobile node with an identified home agent using an established security tunnel.

10. The mobile node of claim 9 wherein the security tunnel unit comprises:
   security association descriptor capable of storing a security association;
   security policy descriptor capable of storing a security policy for at least one of a binding update message, a return routability message, a prefix discovery solicitation message and a payload data packet;
   messaging unit capable of formatting a secure message according to an incoming message that includes at least one of a binding update message, a return routability message, a prefix discovery message and a payload data packet and according to a security association stored in the security association descriptor and further capable of formatting a secure message using a security policy stored in any of the security policy descriptors, wherein the security policy descriptor is selected according to the type of the incoming message.

11. The mobile node of claim 9 wherein the registration unit comprises:
   binding request message unit that directs to the security tunneling unit a binding message directed to a home agent according to an indicator received from the home agent determination unit; and binding acknowledgement unit that receives a binding update acknowledgement from the security tunneling unit according to a tunneling packet received from the home agent using a reverse path security tunnel.

12. The mobile node of claim 9 further comprising a prefix discovery unit capable of discovering an applicable prefix for the determined home agent using the established security tunnel.

13. The mobile node of claim 9 further comprising a payload unit capable of accepting data from a client and directing it to the security tunneling unit.

14. The mobile node of claim 9 further comprising route discovery unit capable of dispatching a return routability message to the security tunneling unit.

15. The mobile node of claim 9 wherein the security tunneling unit is capable of establishing and maintaining a reverse path security tunnel between the mobile node and an identified home agent.

16. The mobile node of claim 15 wherein the security tunneling unit comprises: reverse path security association descriptor capable of storing a security association; reverse path security policy descriptor capable of storing a security policy for at least one of a binding update acknowledgement message, a return routability reply message, a prefix discovery advertisement message and a return payload data packet wherein the messaging unit is capable of unsecuring a secure tunneling message according to a security association stored in the reverse path security association descriptor and according to a security descriptor stored in at least one of the reverse path security policy descriptors wherein the reverse path security policy descriptor is selected according to the type of secure tunneling message received.

17. A mobile node comprising:
processor for executing an instruction sequence;
memory for storing an instructions sequence;
mobile communications interface for communicating with a mobile network;
instruction sequences stored in the memory including:
home agent determination instruction sequence that, when executed by the processor, minimally causes the processor to identify a home agent for the mobile node;
security tunneling instruction sequence that, when executed by the processor, minimally causes the processor to establish a security tunnel from the mobile node to an identified home agent where the security tunnel uses a single security association descriptor to secure a plurality of data paths; and registry instruction sequence that, when executed by the processor, minimally causes the processor to register the mobile node with an identified home agent using the established security tunnel.

18. The mobile node of claim 17 wherein the security tunneling instruction sequence causes the processor to establish a security tunnel by minimally causing the processor to create a single security association that can be used by a plurality of data paths, including, but not limited to data paths for a binding update message, a return routability message, a prefix discovery message and a payload data packet.

19. The mobile node of claim 17 wherein the registry instruction sequence causes the processor to register the mobile node by minimally causing the processor to dispatch a binding update request to an identified home agent using a security tunnel established by the processor when it executes the security tunneling instruction sequence.

20. The mobile node of claim 17 further comprising a prefix discovery instruction sequence that, when executed by the processor, minimally causes the processor to discover a prefix for an identified home agent using a security tunnel established by the processor when it executes the security tunneling instruction sequence.

21. The mobile node of claim 17 further comprising a payload instruction sequence that, when executed by the processor, minimally causes the processor to direct a payload data packet to an identified home agent using a security tunnel established by the processor when it executes the security tunneling instruction sequence.

22. The mobile node of claim 17 further comprising a return path verification instruction sequence that, when executed by the processor, minimally causes the processor to direct a return routability message to an identified home agent using a security tunnel established by the processor when it executes the security tunneling instruction sequence.

23. The mobile node of claim 17 wherein the security tunneling instruction sequence further minimally causes the processor to establish a reverse path security tunnel capable of carrying a plurality of data paths using a single security association.

24. The mobile node of claim 23 wherein the security tunneling instruction sequence, when executed by the processor, minimally causes the processor to establish a reverse path security tunnel by: creating a security policy database for at least one of a binding update message, a return routability message, prefix discovery message and payload data packet; and associating one or more security policy databases with a reverse path security tunnel using a single security association.

25. A computer readable medium having imparted thereon instruction sequences for registering a mobile node with a home agent including:
home agent determination instruction sequence that, when executed by a processor, minimally causes the processor to identify a home agent for the mobile node;
security tunneling instruction sequence that, when executed by a processor, minimally causes the processor to establish a security tunnel from the mobile node to an identified home agent where the security tunnel uses a single security association descriptor to secure a plurality of data paths; and
registry instruction sequence that, when executed by a processor, minimally causes the processor to register the mobile node with an identified home agent.

26. The computer readable medium of claim 25 wherein the security tunneling instruction sequence causes a processor to establish a security tunnel by minimally causing the processor to create a single security association that can be used by a plurality of data paths, including, but not limited to data paths for a binding update message, a return routability message, a prefix discovery message and a payload data packet.

27. The computer readable medium of claim 25 wherein the registry instruction sequence causes the processor to register the mobile node by minimally causing the processor to dispatch a binding update request to an identified home agent using a security tunnel established by the processor when it executes the security tunneling instruction sequence.

28. The computer readable medium of claim 25 further comprising a prefix discovery instruction sequence that, when executed by the processor, minimally causes the processor to discover prefix for an identified home agent using a security tunnel established by the processor when it executes the security tunneling instruction sequence.

29. The computer readable medium of claim 25 further comprising a payload instruction sequence that, when executed by the processor, minimally causes the processor to direct a payload data packet to an identified home agent using a security tunnel established by the processor when it executes the security tunneling instruction sequence.

30. The computer readable medium of claim 25 further comprising a return path verification instruction sequence that, when executed by the processor, minimally causes the processor to direct a return routability message to an identified home agent using a security tunnel established by the processor when it executes the security tunneling instruction sequence.

31. The computer readable medium of claim 25 wherein the security tunneling instruction sequence further minimally causes the processor to establish a reverse path security tunnel capable of carrying a plurality of data paths using a single security association.

32. The computer readable medium of claim 31 wherein the security tunneling instruction sequence, when executed by the processor, minimally causes the processor to establish a reverse path security tunnel by: creating a security policy database for at least one of a binding update message, a return routability message, prefix discovery message and payload data packet; and associating one or more security policy databases with a reverse path security tunnel using a single security association.

33. A mobile node comprising: means for determining a home agent; means for establishing a single-security-association based security tunnel between the mobile node and a determined home agent; and means for registering the mobile node using an established security tunnel.

34. The apparatus of claim 33 wherein the means for establishing a single-security association based security tunnel comprises means for associating a plurality of security policy databases with a single security association.

35. The apparatus of claim 33 wherein the means for registering the mobile node comprises: means for dispatching a binding update message to an identified home agent using an established security tunnel; and means for receiving a binding update acknowledgement by way of a reverse path security tunnel.

36. The apparatus of claim 33 further comprising a means for discovering an applicable prefix for the home agent using an established security tunnel.

37. The apparatus of claim 33 further comprising a means for conveying data to a correspondent node using an established security tunnel.

38. The apparatus of claim 33 further comprising a means for communicating a return routability signal to a determined home agent using an established security tunnel.

39. The apparatus of claim 33 further comprising a means for establishing a reverse path single-security-association based security tunnel.

40. The apparatus of claim 39 wherein the means for establishing a reverse path security tunnel comprises means for associating a plurality of security policy databases with a single security association.

* * * * *